Dec. 11, 1951  C. M. PERKINS ET AL  2,577,912
GYROSCOPE SYSTEM

Filed July 1, 1949  2 SHEETS—SHEET 1

INVENTORS
CORLES M. PERKINS
ALAN M. MAC CALLUM

BY *Sylvester Hartz*
ATTORNEY

Dec. 11, 1951     C. M. PERKINS ET AL     2,577,912
GYROSCOPE SYSTEM

Filed July 1, 1949     2 SHEETS—SHEET 2

INVENTORS
*CORLES M. PERKINS*
*ALAN M. MAC CALLUM*
BY *Sylvester Hasty*
ATTORNEY Patented Dec. 11, 1951

2,577,912

UNITED STATES PATENT OFFICE 2,577,912

GYROSCOPE SYSTEM

Corles M. Perkins, Rutherford, and Alan M. Mac-Callum, Maywood, N. J., assignors to Bendix Aviation Corporation, Teterboro, N. J., a corporation of Delaware Application July 1, 1949, Serial No. 102,671

10 Claims. (Cl. 74—5.47)

The invention relates to gyroscopes for use on moving crafts, and more particularly to gyroscope systems including erecting means for precessing the gyroscopes.

After substantial service, the gimbal bearings of the gyroscope support wear, and a substantial torque is required to precess the gyroscope to overcome bearing friction. If high precessing torques are exerted on the gyroscope, the gyroscope is erected too rapidly, and follows the dynamic vertical too closely. To avoid this difficulty, it is desirable to apply high instantaneous torques to overcome bearing friction and a low average torque to extend the precession over a reasonable period. To attain this result, one erecting system used heretofore had intermittently operated relays in the precessing motor circuit to periodically interrupt energization of the precessing motors. However, constant opening and closing of the relay contacts soon resulted in failure of the relays.

One object of the present invention is to provide an erecting system which exerts high instantaneous precessing torques, and in which the precessing torques are interrupted periodically so that their average value is low, without using relays or other circuit breaking devices.

Another object is to supply substantially large precessing torques for short periods only, so that the average value of the torques is relatively low.

Another object is to energize the precessing motor in response to the erecting data, and to intermittently nullify the erecting data by a pulsing voltage.

Another object is to eliminate errors due to angular acceleration by operating the gyroscope about its bank axis as a free gyroscope momentarily when the craft changes direction.

The invention contemplates combining erecting data signals and a pulsing voltage and impressing the resultant on a power amplifier, and operating a precessing motor in response to the amplifier output. The pulsing voltage periodically nullifies the erecting data signals and reduces amplifier output to interrupt operation of the precessing motors.

The attainment of the above and other objects will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not intended as a definition of the limits of the invention.

In the drawings, Figure 1 is a diagram of a vertical seeking gyroscope system constructed according to the invention.

Figure 1:
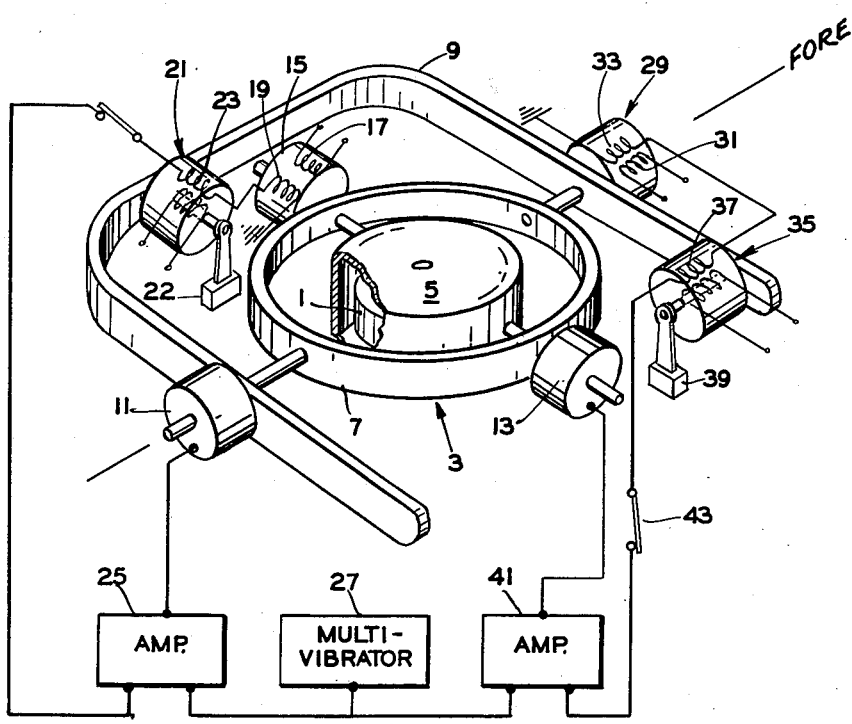

A gyroscope 1 is mounted in a support 3 including gimbals 5, 7 rotatable about mutually perpendicular horizontal axes relative to a casing 9 rigid with the craft on which the gyroscope is mounted. An erector system precesses the gyroscope spin axis to the vertical and includes a pitch precessing motor 11 with its axis extending fore and aft of the craft, that is, on the gyroscope's bank axis, and a bank precessing motor 13 with its axis extending transversely of the craft, that is, on the gyroscope's pitch axis. An inductive device 15, coaxial with the gyroscope's pitch axis, has its rotor 17 mechanically connected to gimbal 5, and its stator winding 19 mechanically connected to gimbal 7. Inductive device 15 produces a voltage signal which is a function of the relative attitude of the craft and gyroscope about the pitch axis. An inductive device 21 has a stator winding 23 mechanically connected to casing 9 and a pendulous rotor 22 swinging lengthwise of the craft. Inductive device 21 produces a voltage signal which is a function of the attitude of the craft about the pitch axis relative to the dynamic vertical. Stator windings 19, 23 are connected in series to the input stage of a pitch erection amplifier 25. The signal from pitch inductive device 15 and the signal from pendulous inductive device 21 are added algebraically, and the algebraic sum, indicated by the sine curve $e_s$ in Fig. 3, is a function of the angle between the gyroscope's spin axis and the dynamic vertical about the pitch axis.

Figure 3:
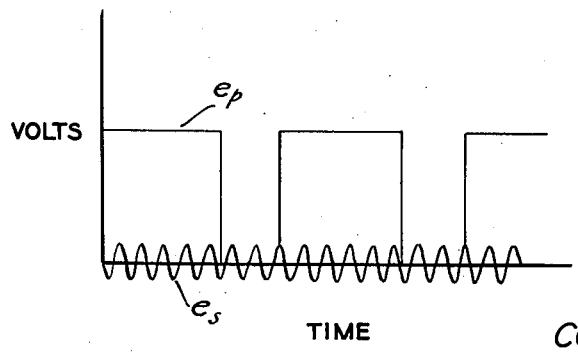
Figure 3 shows the wave forms of the erecting data signals and pulsing voltage.

A multi-vibrator 27 of any suitable kind provides a pulsing voltage of nearly square wave shape, as indicated by the curve $e_p$ in Figure 3. The pulsing voltage of the multi-vibrator is combined with the algebraic sum of the signals from inductive devices 15, 21 and the combined signals and pulsing voltage are impressed on pitch erection amplifier 25.

The output of amplifier 25 is connected to pitch motor 11 and the gyroscope is precessed about its pitch axis by the pitch motor in response to the amplified combined signals and pulsing voltage. The effect of pulsing voltage $e_p$ is to nullify signal sum $e_s$ so that the output of the amplifier 25 is interrupted periodically substantially in phase with the curve $e_p$, as shown in Figure 3. The pitch precessing motor 11 is energized periodically and exerts a series of sharp torques on gimbal 7 to precess the gyroscope about its pitch axis.

The erecting system for precessing the gyroscope about its bank axis is substantially the same as that described for precessing the gyroscope about its pitch axis and includes a bank inductive device 29 coaxial with the gyroscope's bank axis and having its rotor 31 mechanically connected to gimbal 7 and having its stator winding 33 mechanically connected to casing 9. Inductive device 29 produces a voltage signal which is a function of the relative attitude of the craft and gyroscope about the bank axis. An inductive device 35 has a stator winding 37 mechanically connected to casing 9 and a pendulous rotor 39 swinging transversely of the craft. Inductive device 35 produces a voltage signal which is a function of the attitude of the craft about the bank axis relative to the dynamic vertical. Stator windings 33, 37 are connected in series to the input stage of a bank erection amplifier 41. The signal from bank inductive device 29 and the signal from pendulous device 35 are added algebraically and the algebraic sum is a function of the angle between the gyroscope's spin axis and the dynamic vertical about the bank axis. The pulsing voltage from multi-vibrator 27 is combined with the algebraic sum of the signals from inductive devices 29, 35 and the combined signals and pulsing voltage are impressed on bank erection amplifier 41.

The output of amplifier 41 is connected to bank motor 13 and the gyroscope is precessed about its bank axis by the bank motor in response to the amplified combined signals and pulsing voltage so that the bank motor is energized periodically and exerts a series of sharp torques on gimbal 5 to precess the gyroscope about its bank axis.

The bank erecting system differs from the pitch erecting system in that a switch 43 is connected in series with pendulous devices 29, 35 and amplifier 41. Switch 43 preferably is opened when a control 44 (Figure 2) for changing craft direction is operated, so that the bank erecting system is rendered ineffective while the craft changes direction. If desired, switch 43 may be connected in series with bank motor 13 and the output of amplifier 41 or at any other suitable point to interrupt operation of the bank motor while the craft changes direction.

Figure 2:
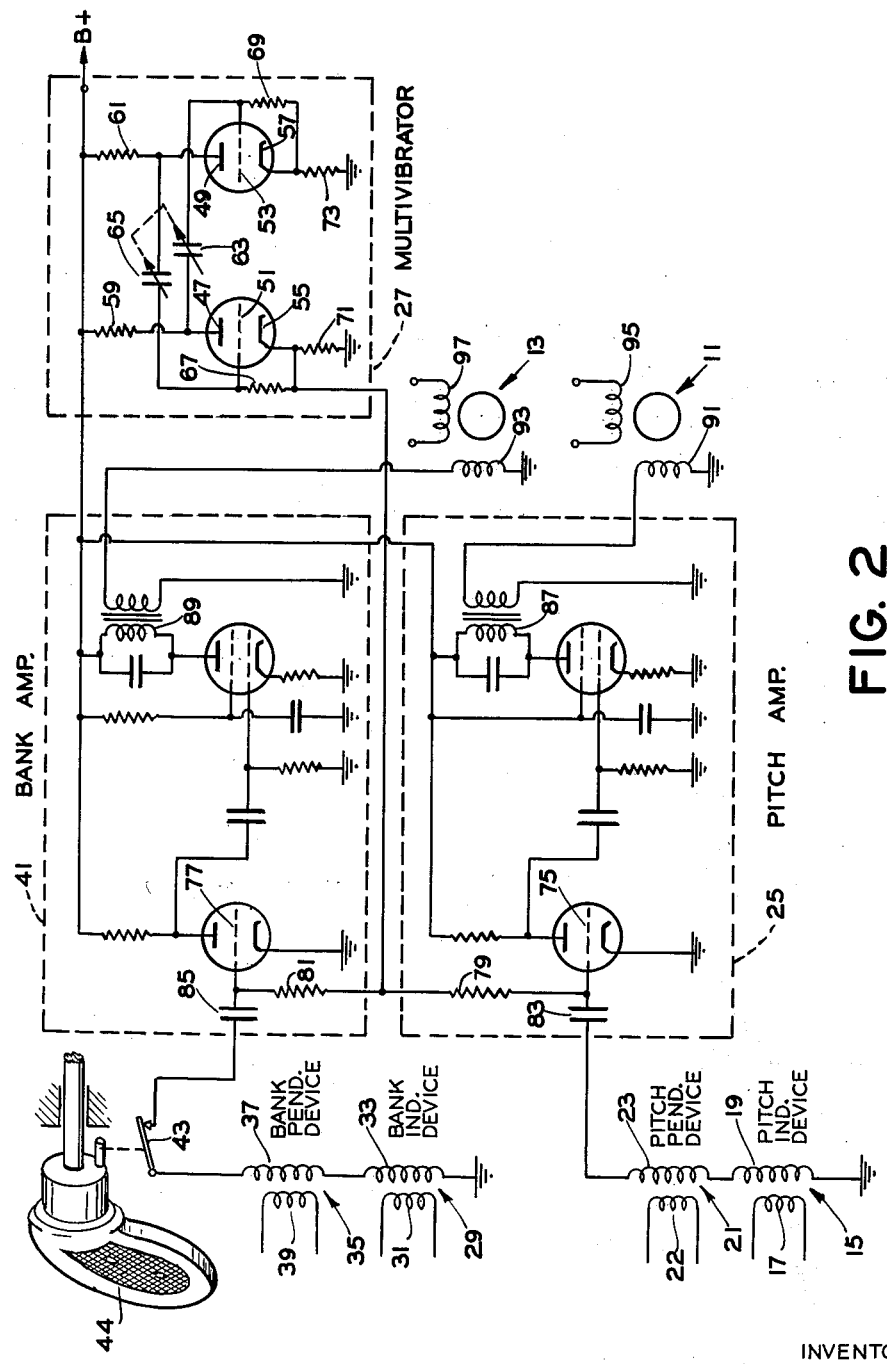
Figure 2 shows a schematic wiring circuit of the gyroscope system.

The multi-vibrator 27, shown in detail in Figure 2, includes a twin triode having plates 47, 49, grids 51, 53 and cathodes 55, 57. The plates 47, 49 are connected to a positive voltage source through resistors 59, 61. Plate 47 is connected to control grid 53 through a coupling condenser 63, and plate 49 is connected to control grid 51 through a coupling condenser 65. Grids 51, 53 are connected to cathodes 55, 57 respectively, through resistors 67, 69. Cathode resistors 71, 73, preferably of approximately 15,000 to 50,000 ohms, are connected in the cathode circuits. Current will flow alternately through the plate cathode circuit at one side of the multi-vibrator and then through the plate cathode circuit at the other side of the multi-vibrator as determined by condensers 63, 65 and resistors 67, 69. When no plate current flows through one side of the multi-vibrator circuit, no potential drop occurs across the corresponding cathode resistor. When plate current flows to this side of the multi-vibrator, a voltage develops across the cathode resistor with the cathode positive relative to ground, and provides a pulse voltage $e_p$ (Figure 3) of nearly square wave shape. Cathode 55 is connected to control grids 75, 77 of the input stages of amplifiers 27, 41 through grid leak resistors 79, 81. Pitch and bank pendulous devices 23, 37 are connected to grids 75, 77 through coupling condensers 83, 85. Cathode resistors 71, 73 are connected directly to ground and the pulse voltage impressed on the input stages of the amplifiers is positive so that the amplifier tubes draw grid current. The signal sum $e_s$ from the bank and pitch inductance devices is nullified in the resulting disturbance and amplification is periodically interrupted. This arrangement does not require critical circuit values.

The output of the amplifiers may be controlled by connecting grids 75, 77 of the amplifier input stages to cathode 55 of the multi-vibrator at a point negative to ground, the negative potential being sufficient to cut off the amplifier when the side of the multi-vibrator connected to the amplifier is not conducting. The negative voltage may be applied by a voltage source through cathode resistor 71 of the multi-vibrator and through grid leak resistors 79, 81 of the amplifiers to grids 75, 77 of the input stages. The circuit values are chosen so that when the associated side of the multi-vibrator conducts, the negative voltage is exactly cancelled by the voltage drop through multi-vibrator resistor 71 when the grid bias of the control stage is at a value where amplification occurs.

Amplifiers 25, 41 preferably are two-stage amplifiers. The input stages are connected as described above to pendulous devices 21, 35 and to multi-vibrator 27, and the output stages are connected through transformers 87, 89 to field windings 91, 93 of pitch and bank torque motors 11, 13. Motor field windings 95, 97 and rotors 17, 22, 31 and 39 may be excited from any suitable alternating power source.

The gyroscope system described above is erected by substantially large precessing torques, to overcome bearing friction, for short periods only, so that the average value of the torques is relatively low and precession is extended over a reasonable period. The precessing torques are interrupted periodically by intermittently nullifying the erecting data by the pulsing voltage from the multi-vibrator, thereby making unnecessary the use of relays. Errors due to angular acceleration are eliminated by operating the gyroscope about its bank axis as a free gyroscope momentarily when the craft changes direction.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilld in the art. For a definition of the limits of the invention, reference will be had primarily to the appended claims.

What is claimed is:

1. In a gyroscope system for use on a moving craft, a gyroscope, a support mounting said gyroscope for rotation about an axis perpendicular to its spin axis, a device for producing a signal in response to movement of the support about said axis relative to the craft, pendulous means for producing a signal in response to movement of the craft about said axis relative to the dynamic vertical, means for producing a pulsing voltage of a magnitude to nullify said signals, an amplifier for receiving said signals and said voltage, and a motor for precessing the gyroscope support about said axis and responsive to the output of said amplifier.

2. In a gyroscope system for use on a moving craft, a gyroscope having its spin axis disposed vertically, a support mounting said gyroscope for rotation about one of its horizontal axes, an inductive device for producing a signal in response to movement of the support about said axis relative to the craft, pendulous means for producing a signal in response to movement of the craft about said axis relative to the dynamic vertical, means for producing a pulsing voltage of a magnitude to nullify said signals, an amplifier for combining said signals and said voltage algebraically, and a motor for precessing the gyroscope support about said axis and responsive to the output of said amplifier.

3. In a gyroscope system for use on a moving craft, a gyroscope, a support mounting said gyroscope for rotation about its bank axis, a device for producing a signal in response to movement of the support about said bank axis relative to the craft, pendulous means for producing a signal in response to movement of the craft about said bank axis relative to the dynamic vertical, a multi-vibrator for producing a pulsing voltage of a magnitude to nullify said signals, an amplifier for combining said signals and said voltage algebraically, and a motor for precessing the gyroscope support about said bank axis and responsive to the output of said amplifier.

4. In a gyroscope system for use on a moving craft having a control for changing the direction of the craft, a gyroscope with its spin axis disposed in a predetermined attitude, a support mounting said gyroscope for rotation about its bank axis, a device for producing a signal in response to movement of the support about said bank axis relative to the craft, pendulous means for producing a signal in response to movement of the craft about said bank axis relative to the dynamic vertical, means for producing a pulsing voltage of a magnitude to nullify said signals, an amplifier for receiving said signals and said voltage, a motor for precessing the gyroscope support about said bank axis and responsive to the output of said amplifier, and means operable by the control for changing the direction of the craft for interrupting precession of the gyroscope support by said motor.

5. In a gyroscope system for use on a moving craft having a control for changing the direction of the craft, a gyroscope with its spin axis disposed vertically, a support mounting said gyroscope for rotation about its bank axis, an amplifier, an inductive device for producing a signal in response to movement of the support about said bank axis relative to the craft, a pendulous inductive device for producing a signal in response to movement of the craft about said bank axis relative to the dynamic vertical and connected in series with said first-mentioned inductive device and to the input of said amplifier, a multi-vibrator for producing a pulsing voltage of a magnitude to nullify said signals and connected to said amplifier, a motor for precessing the gyroscope support about said bank axis and responsive to the output of said amplifier, and a circuit breaking device connected in series with said inductive devices and said amplifier and operable by the control for changing craft direction and arranged to interrupt the signal impressed on said amplifier.

6. In a gyroscope system for use on a moving craft, a gyroscope, a support mounting said gyroscope for rotation about its pitch axis, a device for producing a signal in response to movement of the support about said pitch axis relative to the craft, pendulous means for producing a signal in response to movement of the craft about said pitch axis relative to the dynamic vertical, means for producing a pulsing voltage of a magnitude to nullify said signals, an amplifier for receiving said signals and said voltage, and a motor for precessing the gyroscope support about said pitch axis and responsive to the output of said amplifier.

7. In a gyroscope system for use on a moving craft, a gyroscope, a support mounting said gyroscope for rotation about its pitch axis, an amplifier, a device for producing a signal in response to movement of the support about said pitch axis relative to the craft, pendulous means for producing a signal in response to movement of the craft about said pitch axis relative to the dynamic vertical and connected in series with said device and to the input of said amplifier, a multi-vibrator for producing a pulsing voltage of a magnitude to nullify said signals and connected to said amplifier, and a motor for precessing the gyroscope support about said pitch axis and responsive to the output of said amplifier.

8. In a gyroscope system for use on a moving craft, a gyroscope, a support mounting said gyroscope for rotation about its pitch and bank axes, devices for producing signals in response to movement of the support about said pitch and bank axes relative to the craft, pendulous means for producing signals in response to movement of the craft about said pitch and bank axis relative to the dynamic vertical, a pitch amplifier for receiving said pitch signals, a bank amplifier for receiving said bank signals, means for producing a pulsing voltage of a magnitude to nullify said signals and connected to said amplifiers, and motors for precessing the gyroscope support about said pitch and bank axes and responsive to the outputs of said amplifiers.

9. In a gyroscope system for use on a moving craft, a gyroscope having its spin axis disposed vertically, a support mounting said gyroscope for rotation about its pitch and bank axes, a pitch signal amplifier, an inductive device for producing a signal in response to movement of the support about said pitch axis relative to the craft, pendulous means for producing a signal in response to movement of the craft about said pitch axis relative to the dynamic vertical and connected in series with said inductive device and to the input of said pitch signal amplifier, a bank signal amplifier, an inductive device for producing a signal in response to movement of the support about the bank axis relative to the craft, pendulous means for producing a signal in response to movement of the craft about the bank axis relative to the dynamic vertical and connected in series with said second-mentioned inductive device and to the input of said bank signal amplifier, means for producing a pulsing voltage of a magnitude to nullify said signals and connected to said amplifiers, and motors for precessing the gyroscope support about said pitch and bank axes and responsive to the outputs of said amplifiers.

10. In a gyroscope system, a gyroscope adapted to spin about an axis having a predetermined attitude, a support mounting said gyroscope for rotation about an axis disposed at an angle to its spin axis, means for producing signals in response to departure of the gyroscope spin axis from its predetermined attitude, means for producing a pulsing voltage of a magnitude to nullify the signals, an amplifier for receiving the signals and the voltage, and means for precessing the gyroscope to said predetermined attitude and responsive to the output of said amplifier.

CORLES M. PERKINS.
ALAN M. MacCALLUM.

REFERENCES CITED

The following references are of record in the file of this patent:

UNITED STATES PATENTS

| Number | Name | Date |
| --- | --- | --- |
| 1,687,970 | Corliss | Oct. 16, 1928 |
| 2,293,039 | Esval | Aug. 18, 1942 |
| 2,297,719 | Satterlee | Oct. 6, 1942 |
| 2,357,319 | Esval et al. | Sept. 5, 1944 |